Sept. 29, 1953 G. S. DIEKMAN 2,653,347
COLLAPSIBLE HOG CRADLE
Filed June 6, 1952
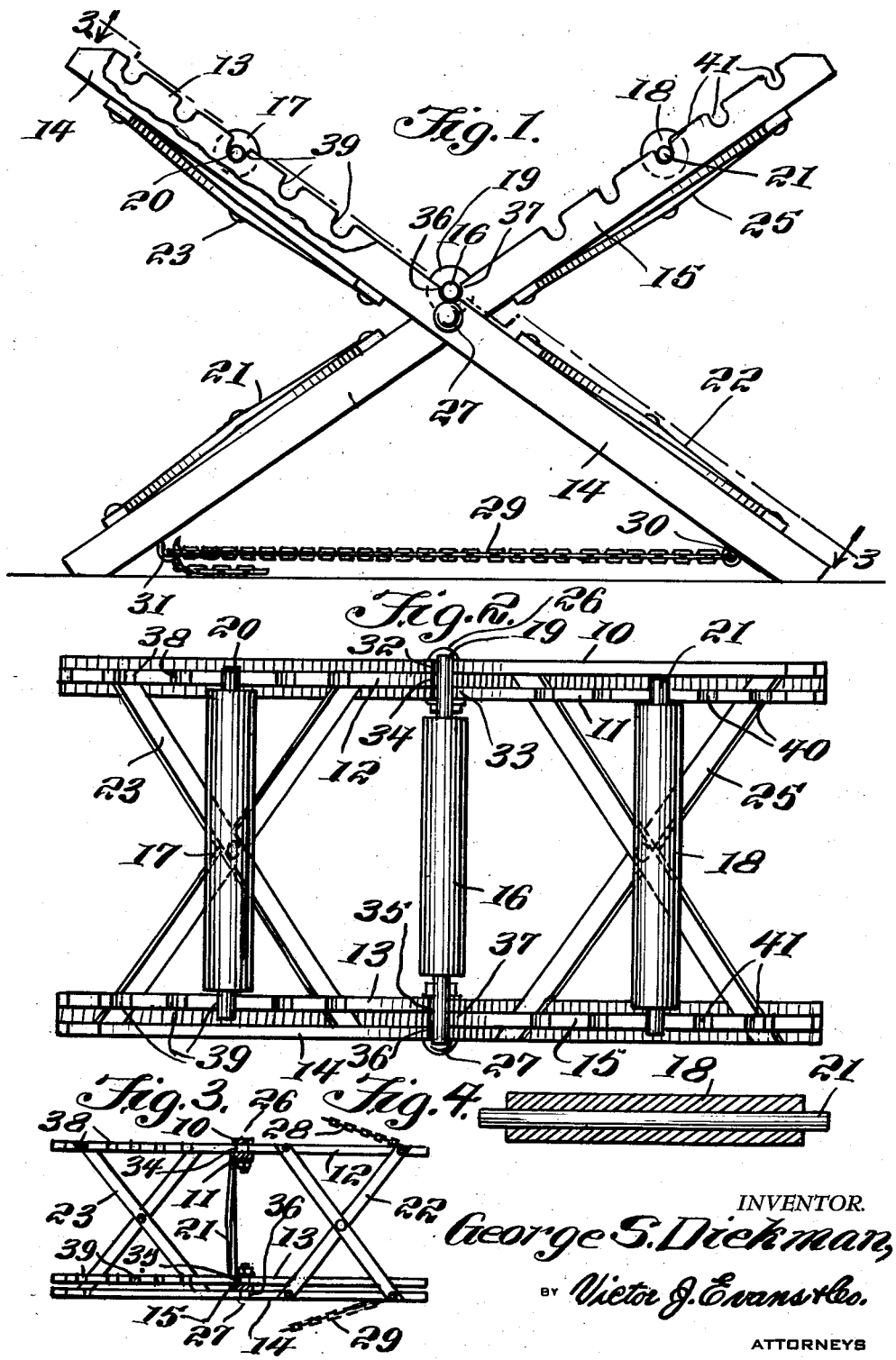
INVENTOR.
George S. Diekman,
BY Victor J. Evans & Co.
ATTORNEYS

Patented Sept. 29, 1953

2,653,347

UNITED STATES PATENT OFFICE 2,653,347

COLLAPSIBLE HOG CRADLE

George S. Diekman, Aplington, Iowa

Application June 6, 1952, Serial No. 292,111

1 Claim. (Cl. 17—44)

This invention relates to stands for holding hogs while skinning and scraping, and in particular a cradle or stand having pivotally connected crossed legs with means for supporting the legs in extended position and with rollers positioned in notches in the upper edges of the legs whereby hogs positioned on the rollers may readily be turned over to facilitate skinning and scraping.

The purpose of this invention is to provide a comparatively open cradle upon which hogs may be placed whereby access is provided to parts of the body from substantially all positions and wherein the body may readily be turned from one position to another.

In the conventional process of scraping and skinning hogs the hogs are dipped in scalding water and placed upon a flat surface for skinning and scraping and when the hogs are comparatively heavy it is sometimes difficult to turn them over so that all parts thereof are readily accessible. With this thought in mind this invention contemplates placing the hogs upon rollers in a comparatively open framework whereby the hogs are readily turned from one position to another and wherein access is provided to all parts thereof.

The object of this invention is, therefore, to provide means for forming a collapsible stand having rollers forming the upper surface thereof whereby the stand may be used for supporting hogs and wherein the rollers facilitate turning the hogs.

Another object of the invention is to provide a hog supporting cradle having rollers in the upper surface positioned to engage the hogs wherein the supporting elements of the rollers are readily collapsible so that they may readily be folded or nested to provide a comparatively small package.

A further object of the invention is to provide a hog scraping and skinning cradle in which hogs are supported on rollers forming the upper surface and in which the device is of a simple and economical construction.

With these and other objects and advantages in view the invention embodies hinged pairs of legs with spaced notches in the upper edges of extended upper ends, with rollers journaled in said notches, with chains connecting the lower ends of the legs with the legs in extended positions, and with crossed braces extended from corresponding sections of the legs for bracing the device with the parts extended.

Other features and advantages of the invention will appear from the following description taken in connection with the drawing, wherein:

Figure 1 is an end elevational view illustrating the improved hog skinning and scraping stand with the parts in extended positions.

Figure 2 is a plan view of the stand with the parts in the position as shown in Fig. 1.

Figure 3 is a sectional plan taken on line 3—3 of Fig. 1 showing the bars of one side in elevation and the bars of the opposite side in section.

Figure 4 is a longitudinal section through one of the rollers illustrating the structure thereof.

Referring now to the drawing wherein like reference characters denote corresponding parts the improved hog skinning cradle of this invention includes legs formed with bars 10 and 11 on one side spaced by a bar 12, bars 13 and 14 on the opposite side spaced by a bar 15, rollers 16, 17, and 18 having shafts 19, 20 and 21, respectively, with which the rollers are journaled in notches in the bars, and diagonally disposed braces and chains for supporting the bars in upright positions.

Diagonal bracing strips, as indicated by the numeral 22, are secured to the upper edges of the lower sections of the bars 12, 13, and 14 and similar bracing strips, as indicated by the numeral 23, are secured to the under surfaces of the bars 12, 13, and 14 at the upper ends thereof and on the opposite side of the center. Similar bracing strips 24 are secured to the upper edges of the lower sections of the bars 10, 11 and 15 and strips 25, also similar to the strips 24 are secured to the under edges of the upper ends of the bars 10, 11, and 15.

The bars 10, 11, and 12 are pivotally connected at the center with a bolt 26 and the bars 13, 14, and 15 are pivotally connected at the opposite end of the cradle with a bolt 27.

The cradle is supported in the extended position with chains 28 and 29 which are connected, at one of the ends thereof, to eyes 30 on the under edges of the lower sections of the outer guide bars 10 and 14 and the opposite ends of the chains are adapted to be connected to hooks 31 on the under edges of the lower sections of the bars 12 and 15. By this means the sections of the cradle are adjustably supported in extended positions.

The extended ends of the shaft 19 of the roller 16 are freely positioned in notches 32, 33 and 34 of the bars 10, 11 and 12, at one end and with the opposite end in notches 35, 36 and 37 of the bars 13, 14 and 15, respectively.

The extended ends of the shaft 20 of the roller 17 are freely supported in notches 38 and 39 in the upper section of bars 12 and 13 and the extended ends of the shaft 21 of the roller 18 are freely supported in similar notches 40 and 41 of the upper ends of the bars 11 and 15, respectively.

With the parts arranged in this manner and with the rollers 16, 17 and 18 removed the bars are readily folded together so that they may be nested for storage and shipping.

When it is desired to use the cradle the bars are set up to the position shown in Fig. 1 and with the chains hooked, as shown, the roller 16 is positioned in the center and the rollers 17 and 18 positioned to correspond with the size of the hog.

As an illustration, with the cradle set up the ends should be substantially 18 inches from the floor, the width 2 feet and the length 5 feet. It will be understood, however, that it is not desired to limit applicant to these dimensions, the dimensions being used for the purpose of illustration only.

It will be understood that as many rollers as may be desired may be used and also that other modifications, within the scope of the appended claim, may be made in the design and arrangement of the parts without departing from the spirit of the invention.

What is claimed is:

A hog skinning cradle comprising bars pivotally connected together at points midway between the ends thereof, said bars having spaced notches in the upper edges of the upper portions of said bars, diagonally disposed braces interconnecting said bars together, a center roller adjacent the intersection of said bars mounted on a shaft and positioned with ends of the shaft extended beyond the ends of the roller, said roller positioned with the extended ends of the shaft in notches of said bars, and side rollers mounted on shafts and having their ends extended through the ends of their rollers and seated in the notches in the upper edges of the upper sections of the bars, said side rollers being arranged adjacent to the upper portions of said bars, the shaft supporting said center roller being longer than the shaft supporting said side rollers, eyes on the lower inner edges of certain of said bars, chains connected to said eyes, and hooks spaced from said eyes and engaging said chains, said cradle adapted to be moved into and out of folded position.

GEORGE S. DIEKMAN.

References Cited in the file of this patent

UNITED STATES PATENTS

| Number | Name | Date |
| --- | --- | --- |
| 53,425 | Elder et al. | Mar. 27, 1866 |
| 341,377 | Finlay | May 4, 1886 |
| 1,400,486 | Huegerich | Dec. 13, 1921 |
| 1,487,941 | Hammett | Mar. 25, 1924 |
| 1,746,115 | Hermanni | Feb. 4, 1930 |
| 2,506,532 | Wilson | May 2, 1950 |